United States Patent [19]
Voigt

[11] Patent Number: 5,587,186
[45] Date of Patent: Dec. 24, 1996

[54] APPARATUS FOR PELLETIZING PLASTICS

[75] Inventor: Jürgen Voigt, Wathlingen, Germany

[73] Assignee: Herman Berstorff Maschinenbau GmbH, Hanover, Germany

[21] Appl. No.: 302,512

[22] Filed: Sep. 8, 1994

[30] Foreign Application Priority Data

Sep. 11, 1993 [DE] Germany ............... 43 30 834.1

[51] Int. Cl.⁶ .................................................. B29B 9/06
[52] U.S. Cl. .................. 425/310; 264/142; 264/143; 425/311; 425/313; 425/DIG. 230
[58] Field of Search ................................ 425/142, 308, 425/310, 311, 313, DIG. 230; 264/141, 142, 143, 148

[56] References Cited

U.S. PATENT DOCUMENTS

| 3,143,766 | 8/1964 | Rohn | 425/313 |
|---|---|---|---|
| 3,271,821 | 9/1966 | Street . | |
| 4,021,176 | 5/1977 | Dettmer et al. | 425/313 |
| 4,179,255 | 12/1979 | Hale | 425/313 |
| 4,251,198 | 2/1981 | Altenburg | 425/313 |
| 4,671,756 | 6/1987 | Bertolotti | 425/313 |
| 4,800,792 | 1/1989 | Bertolotti | 425/313 |
| 5,284,433 | 2/1994 | Cates et al. | 425/313 |

FOREIGN PATENT DOCUMENTS

| 3126550 | 7/1982 | Germany | 425/313 |
|---|---|---|---|
| 2132549 | 7/1984 | United Kingdom . | |

*Primary Examiner*—Jay H. Woo
*Assistant Examiner*—Joseph Leyson
*Attorney, Agent, or Firm*—Foley & Lardner

[57] ABSTRACT

A pelletizing apparatus including rotating cutting knives which are moved against a die plate to sever the plastic strands into pellets. The knives are driven such as to ensure a constantly parallel contact without any partial lifting of the knives from the die plate caused by the unilateral fixing of the cutting knives. This is achieved by a coupler mechanism which connects the knives to the hub of the knife head and ensures a parallel arrangement of the cutting edges of the knives over their entire length relative to the die surface.

6 Claims, 3 Drawing Sheets

(X)

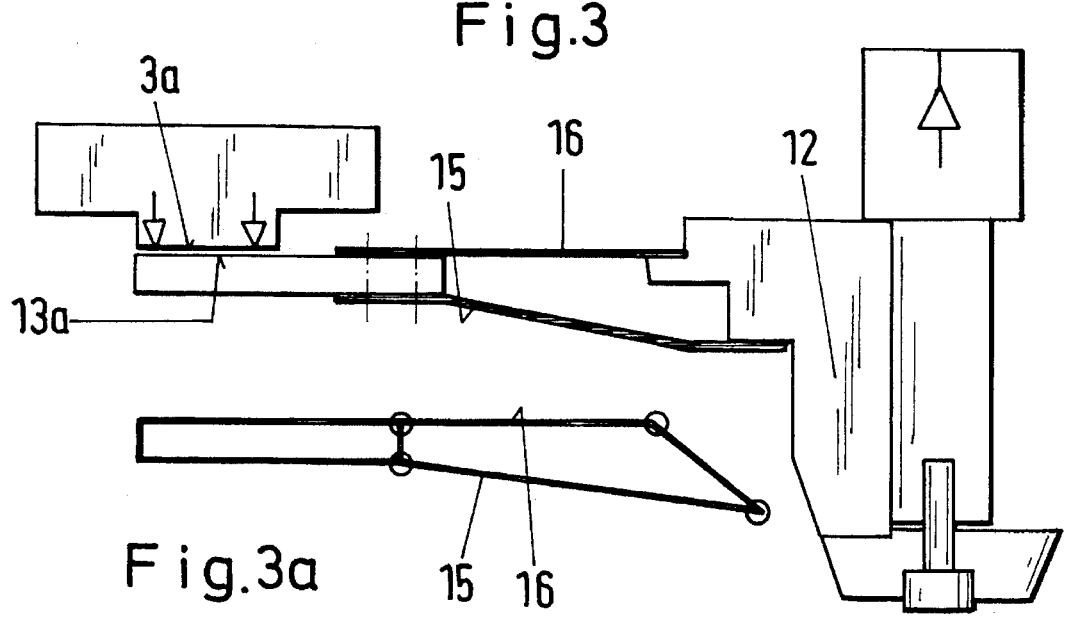
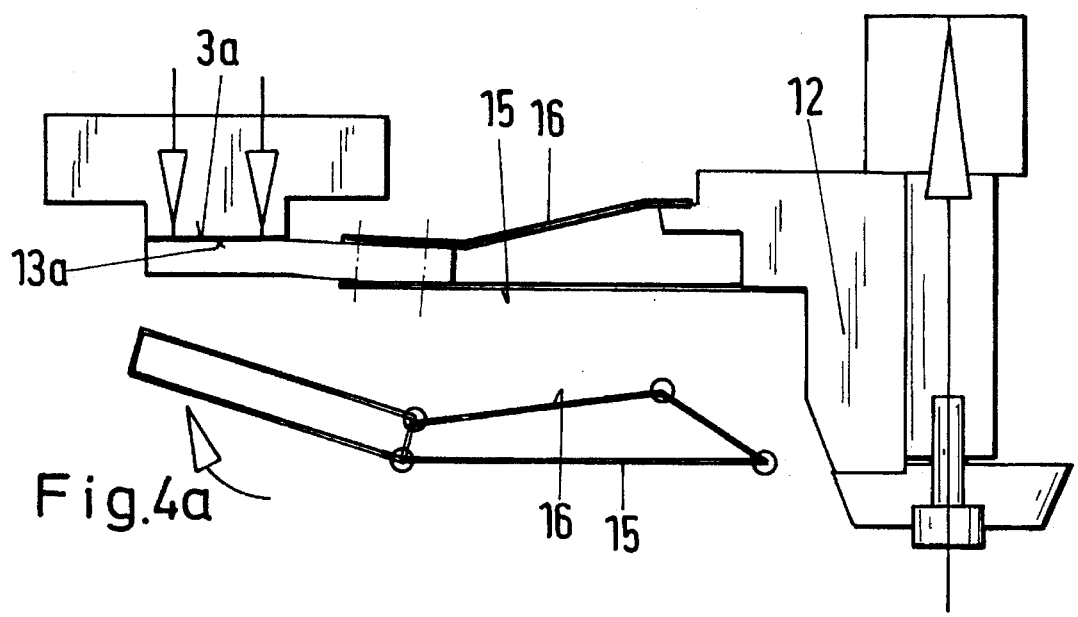

APPARATUS FOR PELLETIZING PLASTICS

BACKGROUND OF THE INVENTION

The present invention relates to apparatus for pelletizing plastics in which plastic melt is discharged through die openings in a stationary die plate, and in which a knife head carrying cutting knives is mounted on a shaft so that the knives can be axially moved toward or away from the die surface to effect pelletizing.

U.S. Pat. No. 3,271,821 discloses pelletizing apparatus of the same general type, with a knife shaft being preloaded in advance direction by means of a hydraulic cylinder which is supported by the housing. The cutting knives are fixed by means of screws to the hub of the knife head. During the cutting process, the cutting knives are in contact with the die plate. When the preloaded cutting knives are moved against the die plate, the outside edges of the knives seen in circumferential direction are slightly lifted from the die plate which implies that no clear cut is obtained in the outside areas relative to the circumference. The inside area of the round die plate relative to the circumference is subject to a relatively high pressure exerted by the cutting knives so that this area is exposed to intensive wear.

SUMMARY OF THE INVENTION

The object of the invention is to develop pelletizing apparatus with cutting knives that are driven at a constant and uniformly adjustable contact force against the die plate. The rotating knives are designed such as to ensure a constantly parallel contact without any sections of the knives being lifted form the die plate due to the unilateral clamping of the cutting knives.

This is accomplished by fixing the cutting knives to the knife head through a coupler mechanism which ensures, regardless of knife pressure, a parallel position of the cutting edges of the knives over their entire length relative to the die surface.

According to the invention, the knife head is pressed against the die plate at a uniform and constant pressure over the entire length of the knife edges. The contact force of the cutting knives against the die plate can be precisely determined within a limited advance range as a function of the advance path. The contact force results from the relative contact force of the hydraulic cylinder unit and the coupler mechanism. For this reason, a flexible and gentle contact of the cutting knives with the die plate is ensured in any advance position within the adjustable working range.

The cutting force (line load) which causes a deformation of the knife in prior art arrangements is compensated for in the present invention by an appropriate load moment that is introduced by the coupling joint. This allows to obtain at any load condition a uniform load distribution on the cutting edge, i.e., a parallel guiding of the knives. Due to the uniform and all-over contact of the knives with the die plate, any vibrations are effectively excluded.

BRIEF DESCRIPTION OF THE DRAWINGS

The invention will be described based on the embodiment shown in the apparatus drawings, in which;

FIG. 3 is a partial cross-sectional view of the present invention, illustrating a cutting knife fixed through a coupler mechanism to a hub with a parallel arrangement of the cutting knife and the die plate in untensioned condition;

FIG. 3a is a schematic representation of the coupler mechanism in a slightly preloaded condition;

FIG. 4 is a partial cross-sectional view similar to FIG. 3, only showing the coupler mechanism in tensioned condition and under full load;

FIG. 4a is a schematic representation of the coupler mechanism in tensioned condition and under full load (extremely overdrawn representation, usually max. 200 my reaction path);

DETAILED DESCRIPTION OF THE PREFERRED EMBODIMENTS

Figure 1:
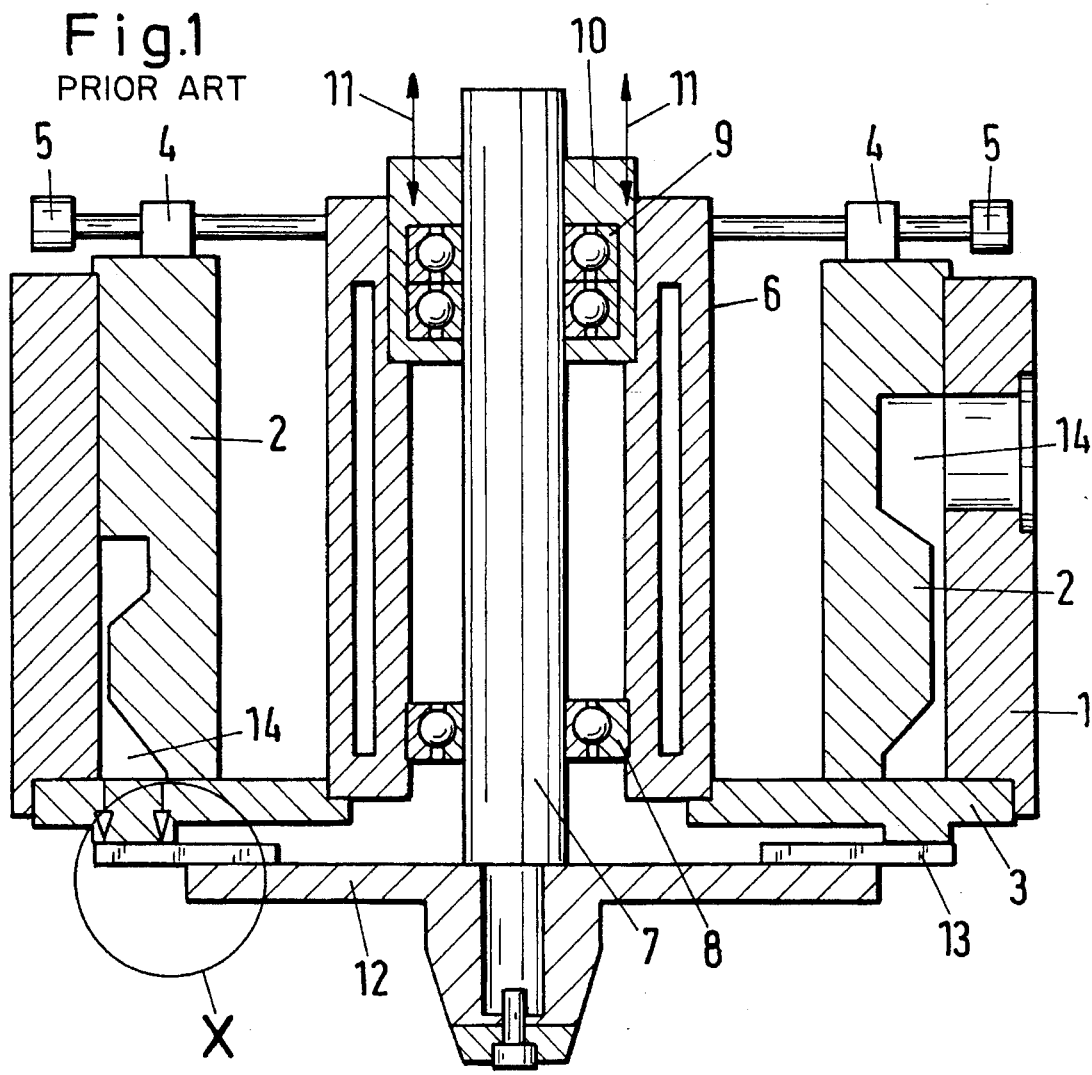
FIG. 1 is a cross section of a pelletizing apparatus constructed in accordance with the prior art.

The pelletizing apparatus of FIG. 1 illustrates a typical prior art pelletizing apparatus including housing 1 with a cylindrical insert 2, both of which are connected to the circular die plate 3. The melt channel 14 is machined in the insert 2.

Supports 4 are fixed to the top side of the insert 2. Studs 5 are guided through these supports and connected to a cylindrical bearing housing 6 that is supported at the bottom by the die plate 3 such as to be moveable as shown in FIG. 1.

By means of the studs 5 acting on the bearing housing 6, several of which are arranged at uniform distances over the circumference, a plane-parallel distance between the cutting knives 13 and the die plate 3 is set once at the beginning. The knife shaft 7 (FIG. 1) is then moved upward so that all cutting knives 13 move against the die plate 3 in plane-parallel position.

The knife shaft 7 is supported in the bearings 8 and 9 within the bearing housing 6. A bearing sleeve 10 is connected to the knife shaft 7 so that both parts can be moved in the direction of the arrows 11 by means of hydraulic cylinders that are per se well known and are accordingly not shown in the drawing. The axial movement is thus transmitted by the knife shaft 7 to the knife head 12 to which the cutting knives 13 are fixed, which allows the distance between the die plate 3 and the cutting knives 13 to be adjusted.

Polymer melt is supplied to the pelletizer via the continuous melt channel 14 and pressed through bores or openings (not shown) in the die plate 3 in a well-known manner, with the melt being discharged at the bottom of the die plate 3 through the die openings in the form of individual strands.

Figure 5:
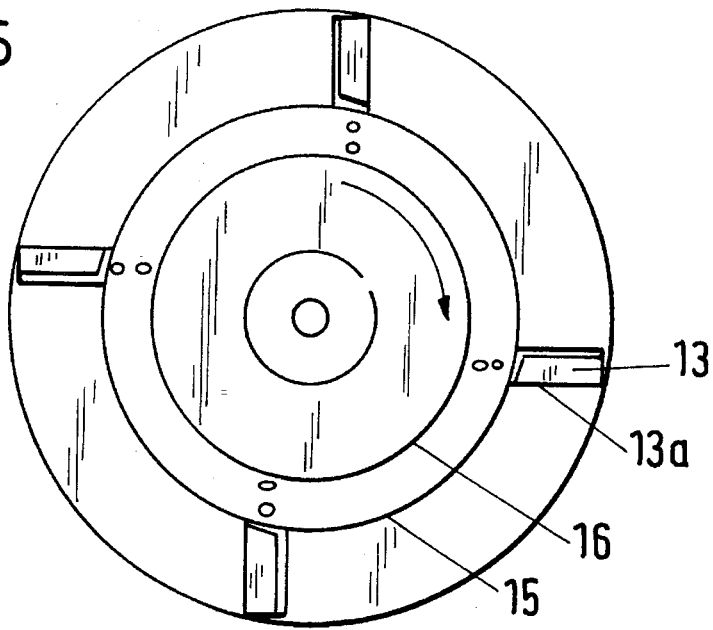
FIG. 5 is a top plan view of a coupler mechanism of plate shape.

The pelletizing process is started by switching on the drive (not shown) for the knife shaft 7. The cutting knives are thus set in a rotary motion, as shown in FIG. 5, and the escaping melt strands are cut to small pellets which usually fall into a cooling water basin and are discharged.

Figure 2:
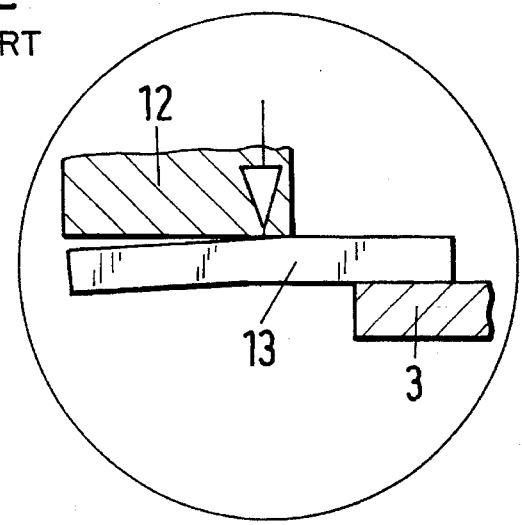
FIG. 2 is an enlarged fragmentary sectional view of the area shown circled at "X" in FIG. 1.

As shown in FIG. 2, the outer section of a cutting knife edge of a pelletizing device according to the prior art is moved against the die plate and slightly pressed back by it so that a distance is formed, which is represented in an enlarged or exaggerated scale in FIG. 2 and actually amounts to a maximum of 200 my.

According to the present invention, this distance and/or the unilateral lifting of the knife edge are avoided by arranging a coupler mechanism between the cutting knives 13 and the hub and/or the knife head 12.

As shown in FIGS. 3 and 3a, the plate-shaped cranks 15, 16 of this coupler mechanism are arranged one above the other, are fixed to the knife head 12, and support the cutting knives 13. FIGS. 3 and 3a show a slightly preloaded coupler mechanism so that the rotating knife edges 13a only lightly touch the surface of the die plate 3a. In case of a more intensive contact resulting from a larger force, a unilateral lifting of the knife edge would be caused as shown in FIG. 2, without a coupler mechanism according to the invention. With the present invention, however, the lifting is avoided as shown in FIGS. 4 and 4a.

FIG. 4 shows that despite the higher contact force exerted by the knife edge 13a on the die plate surface 3a, the plane-parallelism is maintained since the knife edge 13a is first pressed against the outer border or edge of the round die plate, and only thereafter touches the inside border or edge, thus ensuring the plane-parallel arrangement. The unilateral lifting is thus compensated for by the coupler mechanism.

FIG. 4a schematically represents, in an exaggerated form, the course or travel of the force of the coupler mechanism. FIG. 4a clearly shows why the plane-parallel contact between the knife edge 13a and the die plate surface 3a is always ensured despite the increasing contact force.

Figure 6:
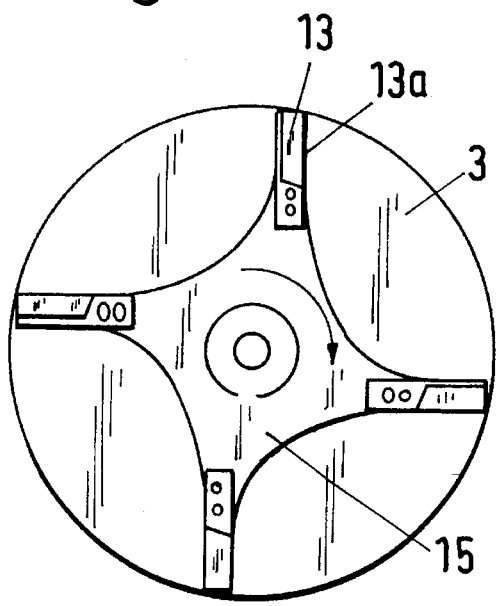
FIGS. 6 and 7 are top plan views of additional modifications of coupler mechanisms.
Figure 7:
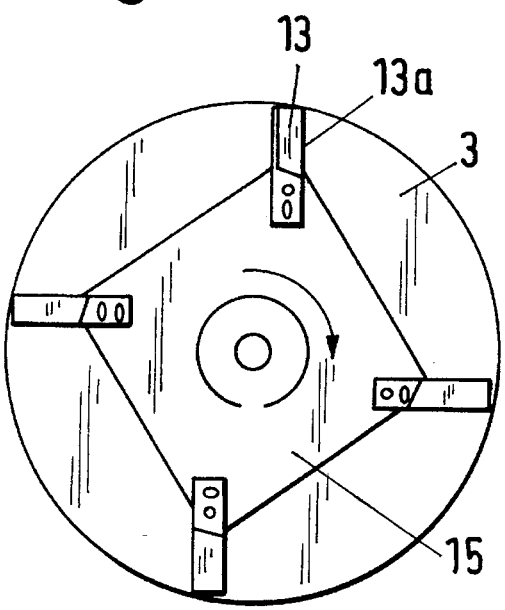

The coupler mechanism illustrated in FIG. 5 is composed of two plate-shaped cranks 15, 16, which are connected with each other. The coupler mechanisms of FIGS. 6 and 7 are provided with cranks 15 of polygonal or star-shaped design for guiding the cutting knives 13.

It will thus be seen that in accordance with the invention, the plane-parallel contact between the knife edge and the die plate surface is always maintained despite the increasing contact force. The avoidance of unilateral lifting encountered in the prior art in response to larger contact forces has the further advantage that wear on the die plate and the knives is effectively excluded.

What is claimed is:

1. Apparatus for pelletizing plastic material discharged through a die plate, comprising:

a stationary housing defining a melt channel, a die plate secured to said housing and formed with die openings through which melt strands are discharged, said die plate having a bottom surface, a knife head mounted for rotation in said housing, a plurality of cutting knives having cutting edges extending radially substantially along and passing closely adjacent to the said bottom surface of said die plate for cutting said strands into pellets, and a coupler mechanism mounted on said knife head and extending radially therefrom, said coupler mechanism comprising a pair of cranks which are coaxially arranged one above the other and which support therebetween said cutting knives, said coupler mechanism being constructed and arranged to maintain the cutting knives parallel to said bottom surface of said die plate over the entire length of contact of said cutting knives with said bottom surface regardless of the pressure exerted by said knives on said bottom surface.

2. The apparatus of claim 1, wherein the cranks are plate-shaped.

3. The apparatus of claim 1, wherein the cranks are polygonal shaped.

4. The apparatus of claim 1, wherein the cranks are star-shaped.

5. The apparatus of claim 1, wherein said knife head is axially adjustable relative to said housing and die plate, whereby contact pressure of said knives on said die plate surface can, through said coupler mechanism, be increased or decreased.

6. The apparatus of claim 1 wherein said coupler mechanism is constructed and arranged such that said cutting knives first pressingly engage an outer border of said die plate radially outwardly of said die openings and thereafter engage an inside border of said bottom surface of said die plate radially inwardly of said die openings, thereby ensuring a plane-parallel arrangement between said cutting knives and the bottom surface of said die plate regardless of the pressure exerted by said knives on said bottom surface.

* * * * *